United States Patent
Nishiyama et al.

(10) Patent No.: US 8,686,897 B2
(45) Date of Patent: Apr. 1, 2014

(54) PIXEL DATA GENERATING DEVICE, IMAGE DISPLAY DEVICE, RADAR APPARATUS, METHOD OF GENERATING PIXEL DATA AND PIXEL DATA GENERATING PROGRAM

(75) Inventors: Koji Nishiyama, Nishinomiya (JP);
Kazuya Nakagawa, Nishinomiya (JP)

(73) Assignee: Furuno Electric Company Limited, Nishinomiya (JP)

(*) Notice: Subject to any disclaimer, the term of this patent is extended or adjusted under 35 U.S.C. 154(b) by 561 days.

(21) Appl. No.: 13/016,294

(22) Filed: Jan. 28, 2011

(65) Prior Publication Data

US 2011/0241933 A1 Oct. 6, 2011

(30) Foreign Application Priority Data

Mar. 31, 2010 (JP) ................................. 2010-080376

(51) Int. Cl.
*G01S 13/00* (2006.01)

(52) U.S. Cl.
USPC ........................................................ 342/179

(58) Field of Classification Search
USPC ........... 342/146, 179, 186; 348/441, 581, 619
See application file for complete search history.

(56) References Cited

U.S. PATENT DOCUMENTS

| | | | |
|---|---|---|---|
| 4,774,516 A | 9/1988 | Henri et al. | |
| 6,788,353 B2* | 9/2004 | Wredenhagen et al. | 348/581 |
| 2002/0193688 A1* | 12/2002 | Hwang et al. | 600/437 |
| 2009/0112095 A1* | 4/2009 | Daigle | 600/454 |
| 2010/0331701 A1* | 12/2010 | Hamada | 600/454 |

FOREIGN PATENT DOCUMENTS

| | | |
|---|---|---|
| JP | 62-164090 A | 7/1987 |
| JP | 11-352211 A | 12/1999 |
| JP | 11-352212 A | 12/1999 |
| JP | 2000-292523 A | 10/2000 |

* cited by examiner

*Primary Examiner* — Dao Phan

(74) *Attorney, Agent, or Firm* — Birch, Stewart, Kolasch & Birch, LLP.

(57) ABSTRACT

The disclosed device generates a plurality of pixel data in an XY coordinate system. The pixel data includes first pixel data generated on a first sweep line, according to a distance from a transmitting source, based on an echo of a detection signal from the source toward a first direction, and second pixel data generated on a second sweep line, according to a distance from the source, based on an echo of a detection signal from the source toward a second direction different from the first direction. The device includes a module for converting the first and second pixel data into data in the XY coordinate system, a module for generating pixel data of an interpolation target pixel located between a first pixel as an observing pixel on an interpolation axis parallel to X-axis or Y-axis and a second pixel as a corresponding pixel on the same interpolation axis, based on the pixel data on the first and second sweep lines.

19 Claims, 8 Drawing Sheets

PIXEL DATA GENERATING DEVICE, IMAGE DISPLAY DEVICE, RADAR APPARATUS, METHOD OF GENERATING PIXEL DATA AND PIXEL DATA GENERATING PROGRAM

CROSS-REFERENCE TO RELATED APPLICATION(S)

The application claims priority under 35 U.S.C. §119 to Japanese Patent Application No. 2010-080376, which was filed on Mar. 31, 2010, the entire disclosure of which is hereby incorporated by reference.

TECHNICAL FIELD

The present invention relates to a pixel data generating device for generating pixel data that is generated according to a distance from a transmitting source, as pixel data in an XY rectangular coordinate system, based on an echo signal of a detection signal discharged from the transmitting source.

BACKGROUND

Signal-processing devices, such as radar apparatuses, display an image where a target object is plotted with respect to the position of the device itself (or its antenna) on a display module so that a user can intuitively grasp the spatial relationship with the target object. Here, since pixels are typically arranged in a lattice structure (matrix) on the display module, when plotting the target object in the image, the pixel position of the target object is treated as a position in an XY rectangular coordinate system. Therefore, in the above signal-processing devices, for the indication on the display module, the pixel data in the XY rectangular coordinate system is typically generated. For example, a radar apparatus used for a ship or the like outputs a radio wave at a predetermined cycle from a rotating antenna (i.e., at every predetermined angle), sequentially plots data obtained from reflection waves of the radio waves to rectangular coordinates to visually express the spatial relationship between the ship and the target object which exists around the ship on the display module.

However, since the information acquired by the radar apparatus is distributed on a straight line which is radially drawn from the ship (located at the center) corresponding to a transmitting direction of the radio wave, a gap between adjacent straight lines becomes larger as a distance from the center becomes greater. Therefore, when the information acquired by the transmission and reception of the radio waves is simply displayed on the display module, an omission of the pixels is generated in a portion distant from the center position and, thus, it causes spoiling of the appearance of the display image. Therefore, in such a radar apparatus, the pixel omitted portion may be detected and interpolated. Such kind of radar apparatus is disclosed in JP11-352211A.

JP11-352211A indicates the radar apparatus configured as follows. The radar apparatus includes an image memory, a LAST detecting module, a pixel omission detecting module, and an interpolating module. The image memory converts coordinates of the reception data from polar coordinates to rectangular coordinates, and stores the converted coordinates. The LAST detecting module determines a matching on the basis of each of corresponding pixels between an arbitrary sample point i on previous sweep line data $\theta_{n-1}$, and a plurality of proximity sample points on the previous sweep line data $\theta_{n-1}$ and current sweep line data $\theta_n$. Then, the LAST detecting module detects the sample point i as a LAST sample point when the corresponding pixel of the sample point i does not match with any of the corresponding pixels of the counterpart sample points. The pixel omission detecting module detects whether each corresponding pixel of the counterpart sample points matches with a pixel adjacent to the corresponding pixel of the LAST sample point on the sweep rotation side. Then, the pixel omission detecting module detects that, as the result of the above detection, there is a pixel-omitted state where the corresponding sample point does not exist in the adjacent pixel when none of those matches. The interpolating module interpolates the adjacent pixel as an interpolation pixel at the time of detecting the pixel omission with data of the adjacent pixel.

Because the pixel omitted portions may change variously in their generated positions and sizes according to parameters, such as the revolving speed of the antenna, the cycle at which the antenna outputs the radio waves, and a magnification of the image to be displayed, they may not be appropriately detected. Regarding this situation, the radar apparatus of JP 11-352211A can detect the omission of pixels adjacent to the pixel determined for LAST. However, when the omissions of pixels occur continuously in the rotating direction of the antenna (i.e., a sweep direction), the pixel omitted portions may not be detected.

In recent years, the display modules for the radar apparatus and the like have been able to perform more precise image expression because of the increase in the number of pixels. For this reason, the pixel omission which has not been expected in the conventional display screen having less number of pixels may newly occur in the recent display module. As a method of interpolating all of such pixel omitted portions, a method of interpolating pixel by pixel between adjacent straight lines (adjacent sweep lines) in the X-axis direction or the Y-axis direction may be considered. According to this method, the interpolation data can be drawn without leaving any pixel omitted portions.

In the meantime, in order to display a smooth radar image, it is necessary to generate the interpolation data so that the pixels drawn by the interpolation processing and the pixels drawn based on the sample data of the sweep lines are smooth therebetween without causing any visual uncomfortableness to the user. Regarding this point, in the method of interpolating pixel by pixel in the X-axis direction or the Y-axis direction, the direction of interpolating the pixels (X-axis direction or Y-axis direction) and the direction in which the continuity of the pixels should be considered (circumferential direction) are different. Therefore, it is difficult to generate the interpolation data simultaneously with the drawing of the interpolation data.

SUMMARY

The present invention is made in view of the above situations, and provides a pixel data generating device provided to image display devices, such as radar apparatuses, and more particularly provides a configuration of the pixel data generating device that can draw interpolation data taking the circumferential direction in consideration without leaving any pixel omitted portions.

According to one aspect of the present invention, a pixel data generating device is provided, that generates a plurality of pixel data as pixel data in an XY rectangular coordinate system. The plurality of pixel data includes first pixel data generated on a first sweep line, according to a distance from a transmitting source, based on an echo signal of a detection signal that is discharged from the transmitting source toward a first direction, and second pixel data generated on a second sweep line, according to a distance from the transmitting source, based on an echo signal of a detection signal that is discharged from the transmitting source toward a second direction different from the first direction. The pixel data generating device includes a pixel data converting module for converting the first pixel data and the second pixel data into pixel data in the XY rectangular coordinate system, respectively, an interpolation pixel data generating module for generating pixel data of an interpolation target pixel that is located between a first pixel as an observing pixel on an interpolation axis parallel to the X-axis or the Y-axis of the XY rectangular coordinate system and a second pixel as a corresponding pixel on the same interpolation axis, based on the pixel data on the first sweep line and the pixel data on the second sweep line.

Thereby, the pixel data of the interpolation target pixel can be generated reflecting the pixel data on the first sweep line and the pixel data on the second sweep line. Because the interpolation processing is performed in the direction parallel to the X-axis or the Y-axis, the pixel data can be generated without leaving any pixel omitted portions.

The interpolation pixel data generating module may generate the pixel data of the interpolation target pixel, based on a plurality of pixel data including the pixel data of the observing pixel and the pixel data of the corresponding pixel.

The interpolation pixel data generating module may generate the pixel data of the interpolation target pixel, based on a plurality of pixel data. The plurality of pixel data may include pixel data of a first reference pixel different from the observing pixel, that is the first pixel on the first sweep line, and pixel data of a second reference pixel different from the corresponding pixel, that is the second pixel on the second sweep line.

The interpolation pixel data generating module may generate the pixel data of the interpolation target pixel, based on a plurality of pixel data. The plurality of pixel data may include at least any of pixel data of the observing pixel, pixel data of the corresponding pixel, pixel data of a first reference pixel different from the observing pixel, that is the first pixel on the first sweep line, and pixel data of a second reference pixel different from the corresponding pixel, that is the second pixel on the second sweep line.

The interpolation pixel data generating module may generate the pixel data of the interpolation target pixel, based on a plurality of pixel data. The plurality of pixel data may include pixel data of a first equal distance pixel located at a substantially equal distance to a distance between a reference position corresponding to the transmitting source and the interpolation target pixel on the first sweep line, and pixel data of a second equal distance pixel located at a substantially equal distance to a distance between the reference position and the interpolation target pixel on the second sweep line.

The interpolation pixel data generating module may generate the pixel data of the interpolation target pixel, based on the pixel data of the first equal distance pixel and the pixel data of the second equal distance pixel, and a first distance between the interpolation target pixel and the first equal distance pixel, and a second distance between the interpolation target pixel and the second equal distance pixel.

The interpolation pixel data generating module may generate the pixel data of the interpolation target pixel, by proportionally dividing the pixel data of the first equal distance pixel and the pixel data of the second equal distance pixel based on the second distance and the first distance, respectively.

The interpolation pixel data generating module may sequentially calculate the pixel data of the interpolation target pixel on the interpolation axis, and sequentially move the interpolation axis in a direction perpendicular to the interpolation axis.

The pixel data generating device may further include an interpolation axis setting module for determining whether the interpolation axis is to be set in a direction parallel to the X-axis or a direction parallel to the Y-axis, based on at least one of azimuth directions of the first sweep line and the second sweep line.

The interpolation axis setting module may determine the direction of the interpolation axis based on whether a direction of the first sweep line or a direction of the second sweep line is close to be in parallel with the Y-axis, or whether the direction of the first sweep line or the direction of the second sweep line is close to be in parallel with the X-axis.

According to another aspect of the present invention, an image display device is provided, which includes any one of the pixel data generating devices described above, and an image display module for displaying an image based on the pixel data generated by the pixel data generating device.

Thereby the pixel data of the interpolation target pixel can be generated reflecting the pixel data on the first sweep line and the pixel data on the second sweep line. Because the interpolation processing is performed in the direction parallel to the X-axis or the Y-axis, the pixel data can be generated without leaving any pixel omitted portions.

According to another aspect of the present invention, a radar apparatus is provided, which includes the image display device described above, a detection signal generating module for generating the detection signal, and an antenna module for discharging the detection signal and receiving an echo signal from a target object.

Thereby, the pixel data of the interpolation target pixel can be generated reflecting the pixel data on the first sweep line and the pixel data on the second sweep line. Because the interpolation processing is performed in the direction parallel to the X-axis or the Y-axis, the pixel data can be generated without leaving any pixel omitted portions.

According to another aspect of the present invention, a method of generating pixel data is provided, which includes generating first pixel data on a first sweep line according to a distance from a transmitting source, based on an echo signal of a detection signal discharged from the transmitting source toward a first direction, generating second pixel data on a second sweep line according to a distance from the transmitting source, based on an echo signal of a detection signal discharged from the transmitting source toward a second direction different from the first direction, converting the first pixel data and the second pixel data into pixel data in an XY rectangular coordinate system, respectively, and generating pixel data of an interpolation target pixel that is located between a first pixel as an observing pixel on an interpolation axis parallel to the X-axis or the Y-axis of the XY rectangular coordinate system and a second pixel as a corresponding pixel on the same interpolation axis, based on the pixel data on the first sweep line and the pixel data on the second sweep line.

Thereby, the pixel data of the interpolation target pixel can be generated reflecting the pixel data on the first sweep line and the pixel data on the second sweep line. Because the interpolation processing is performed in parallel with the X-axis or the Y-axis, the pixel data can be generated without leaving any pixel omitted portions.

According to another aspect of the present invention, a pixel data generating program, readable by a computer, is provided, which includes causing a computer to generate first pixel data on a first sweep line according to a distance from a transmitting source, based on an echo signal of a detection signal discharged from the transmitting source toward a first direction, causing a computer to generate second pixel data on a second sweep line according to a distance from the transmitting source, based on an echo signal of a detection signal discharged from the transmitting source toward a second direction different from the first direction, causing a computer to convert the first pixel data and the second pixel data into pixel data in an XY rectangular coordinate system, respectively, and causing a computer to generate pixel data of an interpolation target pixel that is located between a first pixel as an observing pixel on an interpolation axis parallel to the X-axis or the Y-axis of the XY rectangular coordinate system and a second pixel as a corresponding pixel on the same interpolation axis, based on the pixel data on the first sweep line and the pixel data on the second sweep line.

Thereby, the pixel data of the interpolation target pixel can be generated reflecting the pixel data on the first sweep line and the pixel data on the second sweep line. Because the interpolation processing is performed in parallel with the X-axis or the Y-axis, the pixel data can be generated without leaving any pixel omitted portions.

BRIEF DESCRIPTION OF THE DRAWINGS

The present disclosure is illustrated by way of example and not by way of limitation in the figures of the accompanying drawings, in which the like reference numerals indicate like elements and in which.

DETAILED DESCRIPTION

Figure 1:
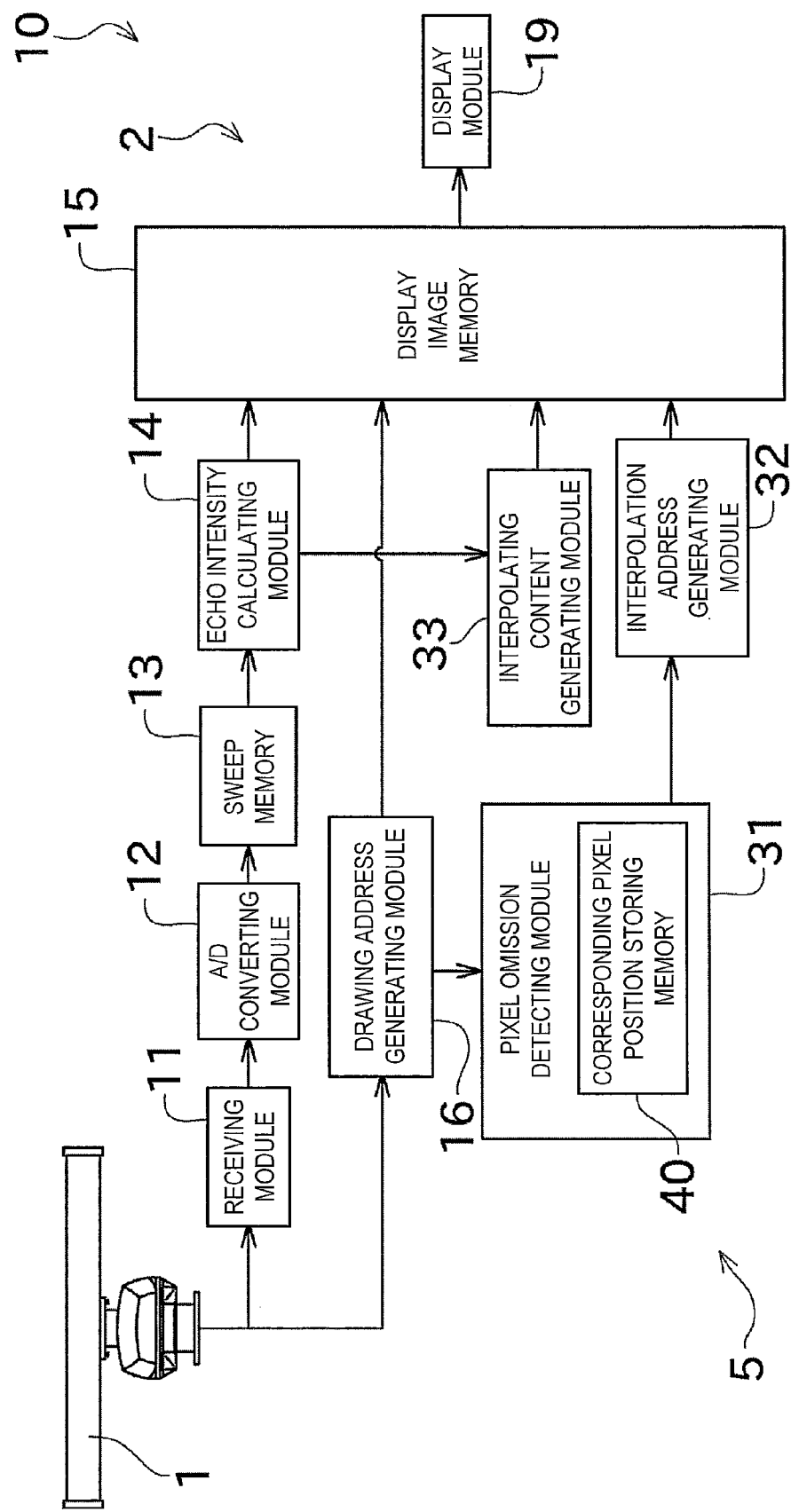
FIG. 1 is a block diagram schematically showing a configuration of a radar apparatus according to one embodiment of the present invention.

Next, one embodiment of the present invention is described with reference to the accompanying drawings. FIG. 1 is a block diagram schematically showing a configuration of a radar apparatus 10 according to this embodiment.

As shown in FIG. 1, the radar apparatus 10 includes a radar antenna 1 and an image display device 2 (image display module).

The radar antenna 1 is configured so as to transmit (radiate) a detection signal which is a pulse-shaped radio wave and receive an echo signal which is a reflection wave of the transmitted radio wave. The radar antenna 1 revolves in a horizontal plane at a predetermined cycle, and repeatedly outputs the detection signal while an azimuth direction is changed at a cycle shorter than the revolving cycle. The radar antenna 1 is provided with a detection signal generating device (not illustrated) and functions also as a detection signal generating module.

The image display device 2 includes a receiving module 11, an A/D converting module 12, a sweep memory 13, a pixel data generating device 5, and a display module 19, as main components.

The receiving module 11 detects and amplifies the reflection wave received by the radar antenna 1, and outputs it to the A/D converting module 12. The A/D converting module 12 converts the analog signal transmitted from the receiving module 11 into a suitable digital signal.

The sweep memory 13 stores the reception data for one sweep which is converted into the digital signal by the A/D converting module 12. Note that the term "sweep" as used herein refers to a series of operations from a transmission of the detection signal to another transmission of the subsequent detection signal, and the term "reception data for one sweep" as used herein refers to data received during a period from the transmission of the detection signal to another transmission of the subsequent detection signal.

Because the radio wave has a characteristic in which it travels straight, the reception data for one sweep represents a situation on one straight line that is drawn toward the facing (transmitting) direction of the radar antenna 1 from a ship which equips the radar apparatus (hereinafter, referred to as "the ship") as the starting point. When the radar antenna 1 transmits the detection signal to the direction of the straight line, an echo signal by a target object near the ship is received at an earlier timing, and an echo signal by a farther target object is received at a later timing. Therefore, the reception data for one sweep contains information on whether a target object is located on the straight line, and when the target object exists, contains information on a distance of the target object from the ship as well. The sweep memory 13 can store the reception data for one sweep in a chronological order.

The pixel data generating device 5 generates pixel data that constitutes an image to be displayed on the display module 19, and a computer program for generating the pixels is stored in a memory module (not illustrated). The pixel data generating device 5 is described in details. The pixel data generating device 5 includes an echo intensity calculating module 14, a display image memory 15, a drawing address generating module 16, an pixel omission detecting module 31, an interpolation address generating module 32, and an interpolating content generating module 33.

The echo intensity calculating module 14 reads the reception data for one sweep in chronological order from the sweep memory 13 and calculates an amplitude sequentially to calculate an echo intensity at each of two or more points set at equal intervals in the reception data. This substantially corresponds to detecting the echo intensity of the reflection wave at each of two ore more time points set at equal time intervals from the time point of the transmission of the detection signal from the radar antenna 1.

Data groups, each containing the echo intensities acquired by the echo intensity calculating module 14 (hereinafter, each data group may also be referred to as an "echo intensity data group for one sweep"), are outputted to the display image memory 15 in chronological order and stored sequentially. The drawing address generating module 16 determines pixels where the echo intensity data group for one sweep is to be stored among the image data of the display image memory 15.

The display image memory 15 stores image data having a plurality of pixel data for displaying an image on the display module 19 (raster data). The image held by the display image memory 15 (hereinafter, referred to as "the display image") is represented by a number of pixels being arranged laterally and vertically in a lattice structure (a matrix of m×n pixels).

The data of the display image stored in the display image memory 15 is read out at a suitable timing and displayed on the display module 19. The display image memory 15 stores information on the echo intensity and the like as the pixel data for each pixel.

The drawing address generating module 16 as a pixel data converting module (pixel position calculating module) can obtain a corresponding position (address) of the pixel in the display image for each of the echo intensity data which constitute the echo intensity data group for one sweep obtained by the echo intensity calculating module 14. The drawing address generating module 16 is inputted with a signal indicating an angle θ of the radar antenna 1 at the time of transmitting the detection signal. The drawing address generating module 16 calculates the position of the pixel corresponding to the data of each echo intensity based on the angle θ, a radar range and the like of the radar antenna 1, by the following method.

When the echo signal is returned at a time point in which a time t has passed after the transmission of the detection signal from the radar antenna 1, it means that the radio wave had gone and come back for a distance r between the radar antenna 1 and a target object during the time t. Therefore, if a polar coordinate system where the radar antenna 1 is set to the origin is defined in a horizontal plane, a position of the target object corresponding to the echo intensity when the time t has passed after the radar antenna 1 transmitted the detection signal can be expressed as (r, θ)=(c×t/2, θ) in the polar coordinate system where the antenna angle at the time of the transmission of the detection signal from a predetermined reference azimuth direction (for example, north) is set to θ. Here, c is the speed of light. In the polar coordinate system, the antenna angle θ becomes 0° when the radar antenna 1 faces toward a predetermined azimuth direction (e.g., north), and it becomes a positive value in the normal rotating direction of the radar antenna 1. Note that a hull-based coordinate system (bow-direction basis) may also be used as the predetermined azimuth direction.

On the other hand, the display image held by the display image memory 15 is represented by the pixels arranged in the lattice structure (matrix) as described above. In this embodiment, the position of each pixel in the display image is treated in an XY rectangular coordinate system where the upper left corner of the image is set to the origin, the rightward direction is set to the X-axis, and the downward direction is set to the Y-axis.

The drawing address generating module 16 calculates the position of the pixel in the display image where the information on the echo intensity is to be stored. Specifically, the pixel position (X, Y) is calculated by the following Equations (1) where the position of the ship (or, more particularly, the radar antenna 1) in the XY rectangular coordinate system is set to (Xs, Ys).

$$X = Xs + kt \times \sin\theta$$
$$Y = Ys - kt \times \cos\theta \tag{1}$$

Here, t is a lapsed time from the transmission of the detection signal from the radar antenna 1, k is a constant defined by taking a size of a display range of the display module 19, the radar range and the like in consideration, and θ is the antenna angle. Note that, because (X, Y) is to specify the position (address) of the pixel constituting the display image, the fraction below a decimal point is suitably rounded in the calculation results of X and Y.

In this embodiment, each data constituting the echo intensity data group for one sweep is outputted to the display image memory 15 in chronological order from the echo intensity calculating module 14. Then, the drawing address generating module 16 sequentially calculates the pixel position (X, Y) corresponding to each echo intensity data according to Equations (1), and outputs it to the display image memory 15. Therefore, when processing the echo intensity data group for one sweep, the drawing address generating module 16 repeatedly calculates (X, Y) while setting θ constant and increasing t from zero in the above equations.

By the above calculation, the position (X, Y) which represents the pixel on the display image corresponding to the echo intensity data group for one sweep in the XY rectangular coordinate system is located on a straight line at the angle θ with respect to the ship position (Xs, Ys). Note that, in the following description, this straight line may be referred to as a "sweep line."

Therefore, the drawing address generating module 16 has a function to calculate the pixel position (X, Y) in the display image corresponding to the point on the straight line (i.e., the point on the sweep line). The drawing address generating module 16 also has a function as a coordinate converting module to convert the point (r, θ) on the sweep line represented by polar coordinates into the pixel position (X, Y) in the XY rectangular coordinate system.

The pixel position (X, Y) obtained as the calculation result by the drawing address generating module 16 moves sequentially so that it separates from the ship position (Xs, Ys) as t increases from zero, and the moving track draws one straight line (the sweep line). The echo intensity data group for one sweep is stored as pixel data in the pixel at the calculated position so that the one sweep line is drawn in the display image.

In the following description, the storing the information on the echo intensity as the pixel data in the pixel of the display image stored in the display image memory 15 may be expressed as "drawing" in the pixel (or "filling" the pixel).

Because the angle θ of the radar antenna 1 is changed every time the detection signal is transmitted once, the angle of the sweep line also changes accordingly. In the following description, a sweep line based on sample data when the antenna angle is $\theta_n$ is referred to as a "sweep line S1 (first sweep line)." Further, a sweep line based on sample data when the antenna angle is $\theta_{n-1}$ (here, $\theta_n > \theta_{n-1}$) is referred to as a "sweep line S2 (second sweep line)."

The pixel omission detecting module 31 detects an omission of a pixel which exists in the image data. The pixel omission detecting module 31 detects the pixel omission which is generated between the sweep line S1 and the sweep line S2 based on the position of the pixel on the sweep line S1 and the position of the pixel on the sweep line S2. The pixel omission detecting module 31 has a corresponding pixel position storing memory 40 (a memory module or a second pixel position storing memory) for storing the position of the pixel on the sweep line. The corresponding pixel position storing memory 40 is constituted with suitable hardware, such as a RAM. The details of the pixel omission detection by the pixel omission detecting module 31 will be described later.

The interpolation address generating module 32 generates an interpolation address indicating the position of the pixel (an address in the display image memory 15) equivalent to the portion determined by the pixel omission detecting module 31 to be the pixel omission.

The interpolating content generating module 33 as an interpolation pixel data generating module generates the content that is to fill the portion determined by the pixel omission detecting module 31 to be the pixel omission (interpolation data). The interpolation data is written in the display image memory 15 based on the interpolation address generated by the interpolation address generating module 32, and, thereby, an interpolation is carried out. The details of the generation of the interpolation data by the interpolating content generating module 33 will be described later.

The display module 19 is a raster-scan display device constituted with a CRT, a LCD, etc. The image data of the display image which is read from the display image memory 15 is displayed by the display module 19.

In the radar apparatus 10 of the above configuration, the echo intensity calculating module 14 obtains the echo intensity data group for one sweep based on the echo signal when transmitting the detection signal from the radar antenna 1. Further, the drawing address generating module 16 sequentially obtains the position of two or more pixels (in the XY rectangular coordinate system) based on the angle θ of the radar antenna 1 at the time of the detection signal transmission, at which the echo intensity data group for one sweep is stored in the display image memory 15.

Thus, based on the above results, as if the sweep line at the angle θ is drawn in the display image held by the display image memory 15, each data constituting the echo intensity data group is stored as the pixel data in the display image memory 15. By repeating the above processing while changing the angle θ of the radar antenna 1 little by little, one sweep line can be drawn centering on the ship position in the image data of the display image memory 15.

The image data obtained in this way is read out from the display image memory 15 at a suitable timing, and after synthetic processing with other information is suitably performed, the image data is displayed on the display module 19. As a result, the image where many sweep lines are drawn radially is displayed on the display module 19, and a user can know the spatial relationship between the ship and target objects around the ship by seeing the image. In the image of the display image memory 15, a new sweep line is repeatedly drawn associated with the revolution of the radar antenna 1, and, as a result, the image displayed on the display module 19 is also updated accordingly.

Figure 2:
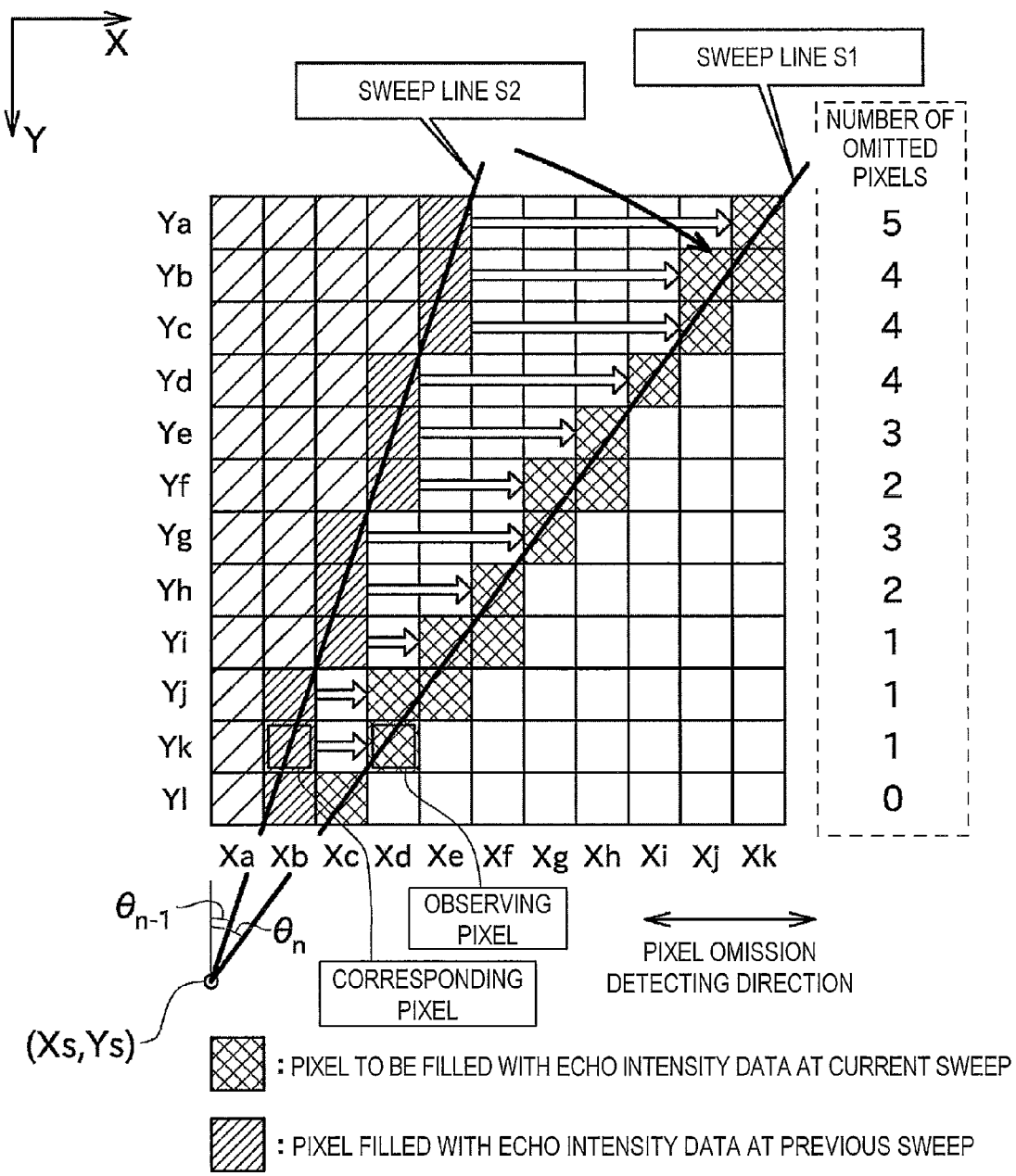
FIG. 2 is a view illustrating a pixel omission detection in the X-axis direction.

Next, the pixel omission detection and the interpolation processing of the radar apparatus 10 are described. FIG. 2 is a view illustrating the pixel omission detection in the X-axis direction.

The pixel omission detection by the pixel omission detecting module 31 is to detect an omission of a pixel generated between adjacent sweep lines, along the pixel arranged direction in the display image memory 15 (X-axis direction).

Hereinafter, a case where the pixel omission is detected in the X-axis direction is described. There are two or more pixels at which the information such as the echo intensity is written in order to draw the sweep line S1 on the display image; however, here, we only pay attention to one pixel among those pixels and let the pixel be an observing pixel (first pixel). The observing pixel can be calculated by the drawing address generating module 16 based on the antenna angle and the like. Next, among the two or more pixels where the echo intensities are written when the sweep line S2 is drawn, a pixel having the same Y-coordinate as the observing pixel (in other words, a pixel corresponding to the observing pixel in the X-axis direction) are searched. Then, let the found pixel be a corresponding pixel (second pixel). In this embodiment, the sweep line S1 corresponds to the first sweep line, and the sweep line S2 corresponds to the second sweep line.

Next, a spatial relationship between the observing pixel and the corresponding pixel is examined. When the observing pixel and the corresponding pixel are adjacent to or overlap with each other in the X-axis direction, it is determined that the pixel omission has not being generated in the X-axis direction. On the other hand, when one or more pixels (intermediate pixels) between the observing pixel and the corresponding pixel exist, it is determined that the pixel omission has been generated (the intermediate pixels are the pixel omitted portion).

In this embodiment, the sweep line S1 is a current sweep line which is currently processed (or is to be drawn). The sweep line S2 is a previous sweep line which was processed (drawn) immediately before the sweep line S1, and is a sweep line which is oriented to a different direction from the sweep line S1. The sweep line S1 which is currently processed (current sweep line) will be a previous sweep line in a relation with the sweep line which will be processed next time. Thus, the pixel omission detecting module 31 stores in the corresponding pixel position storing memory 40 the pixel position (X, Y) calculated by the drawing address generating module 16 when drawing the current sweep line in the display image, in order to use the position (X, Y) for the pixel omission detection when drawing the next sweep line. It should be appreciated that the method of detecting the pixel omission and the method of generating the interpolation data (pixel data) of this embodiment are applicable to the interpolation processing of the pixel omitted portion between two sweep lines if the directions of the sweep lines are different from each other even if it is a case where the sweep lines do not continue in time or they are not adjacent to each other.

The pixel omission detecting module 31 specifies the Y-coordinate of the observing pixel as an index of the corresponding pixel position storing memory 40 and refers to the stored content to acquire the X-coordinate of the corresponding pixel. Then, the existence of the intermediate pixel located between the pixels is determined by calculating a difference between the X-coordinate of the observing pixel and the X-coordinate of the corresponding pixel. Alternatively, when the direction of the pixel omission detection is the Y-axis direction, an index of the X-coordinate is assigned to the corresponding pixel position storing memory 40, and a Y-coordinate corresponding to the X-coordinate is stored.

Next, an example in which the pixel omission is detected in the X-axis direction is described in details. FIG. 2 conceptually shows a part of the display image, where one grid corresponds to one pixel. As shown in FIG. 2, two or more pixels are arrayed vertically and laterally to constitute the display image, where the pixels in which the sweep line S2 is drawn and the pixels in which the sweep line S1 is drawn are schematically illustrated.

As described above, drawing of the pixels to form the sweep line in the display image is performed sequentially from a pixel near the pixel position (Xs, Ys) corresponding to the ship. Then, every time one pixel is drawn, the pixel omission detection is performed for the pixel concerned as the observing pixel. Thus, by performing the pixel omission detection processing every time one pixel of the sweep line S1 is drawn, all of the pixel omissions generated between the sweep line S1 and the sweep line S2 can be detected.

Hereinafter, a case where a pixel of (Xd, Yk) in the image of FIG. 2 is treated as an observing pixel is described as an example. When (Xd, Yk) is obtained as a result of calculation of the position of the pixel corresponding to the point on the sweep line S1 by the drawing address generating module 16, the pixel omission detecting module 31 specifies a value of the Y-coordinate of the pixel (observing pixel), i.e., Yk as an index, and refers to the content of the corresponding pixel position storing memory 40. The corresponding pixel position storing memory 40 stores Xb which is the X-coordinate at the time of drawing the sweep line S2 as a value of the X-coordinate which corresponds to Yk. Thereby, the position (Xb, Yk) of the corresponding pixel which corresponds to the observing pixel can be obtained.

Next, the pixel omission detecting module 31 calculates a difference of the X-coordinates between the observing pixel and the corresponding pixel. Since the value of the difference is two or more (in this example, Xd−Xb=2), it can be seen that both the pixels are not adjacent to each other and they do not overlap with each other (in other words, one or more pixels exist between both the pixels). Therefore, the pixel omission detecting module 31 determines that there is a pixel omission or pixel omissions.

After the determination of the pixel omission, the stored content of the corresponding pixel position storing memory 40 are updated. That is, the Y-coordinate (Yk) of the observing pixel is specified as the index, and the stored content of the corresponding pixel position storing memory 40 which corresponds to the Y-coordinate is overwritten with the X-coordinate (Xd) of the observing pixel. Thereby, the position of the pixel which is specified by the corresponding pixel position storing memory 40 moves in the X-axis direction, as shown by a white arrow of FIG. 2.

Next, a case where a pixel of (Xc, Yl) is treated as an observing pixel is described. In this case, when Yl is specified as an index and the stored content of the corresponding pixel position storing memory 40 is referred, it can be seen that an X-coordinate of a pixel corresponding to the observing pixel in the X-axis direction (corresponding pixel) is Xb. When a difference value of X-coordinates between both the pixels is calculated, because it is Xc−Xb=1, both the pixels are adjacent to each other. Therefore, the pixel omission detecting module 31 determines that there is no pixel omission.

In this embodiment, when the pixel omission detecting module 31 determines that the pixel omission exists, the pixel omission detecting module 31 outputs it along with the number of omitted pixels. The number of omitted pixels means the number of pixels located between the observing pixel and the corresponding pixel (intermediate pixels), and it can be obtained by subtracting 1 from the difference value of the X-coordinates. When the number of omitted pixels is zero, it means that a pixel omission is not detected.

Alternatively, when detecting the pixel omission in the Y-axis direction, the pixel omission can be detected by similar processing to the method of detecting the pixel omission in the X-axis direction. When the detecting direction of the pixel omission is the Y-axis direction, one pixel is selected from the pixel group to be written in order to draw the sweep line S1 and set it as an observing pixel. Further, from the pixel group written in order to draw the sweep line S2, a pixel with the same X-coordinate as the observing pixel (a pixel corresponding to the observing pixel in the Y-axis direction) is searched, and let this be a corresponding pixel. Then, if one or more pixels exist between the observing pixel and the corresponding pixel, it is determined that the portion of the pixels (intermediate pixels) is a pixel omission.

In this embodiment, the detection of the pixel omission is configured so that it switches according to the angle θ of the radar antenna 1 (a sweep angle which is the angle of the sweep line). That is, the detecting direction of the pixel omission is automatically switched between the X-axis direction and the Y-axis direction depending on the sweep angle. More specifically, the detection of the pixel omission is performed in the X-axis direction within a range of the sweep angle θ from −45° (315°) to 45° and a range from 135° to 225°. On the other hand, within a range of the sweep angle from 45° to 135° and a range from 225° to 315°, the detection of the pixel omission is performed in the Y-axis direction. Such a determination of the detecting direction of the pixel omission is performed by a sweep angle determining module (not illustrated). As the sweep angle referred by the determination, one or both of the angle $\theta_n$ of the sweep line S1 and the angle $\theta_{n-1}$ of the sweep line S2 can be used. The intermediate pixels detected by the above processing are interpolated as pixels to be interpolated.

Figure 3A:
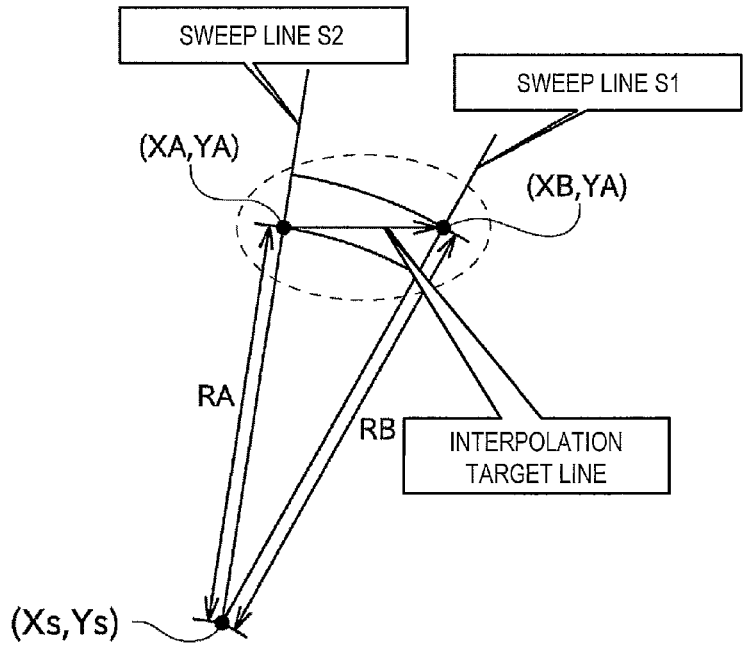
FIGS. 3A and 3B are views illustrating generation of interpolation data in the X-axis direction.
Figure 3B:
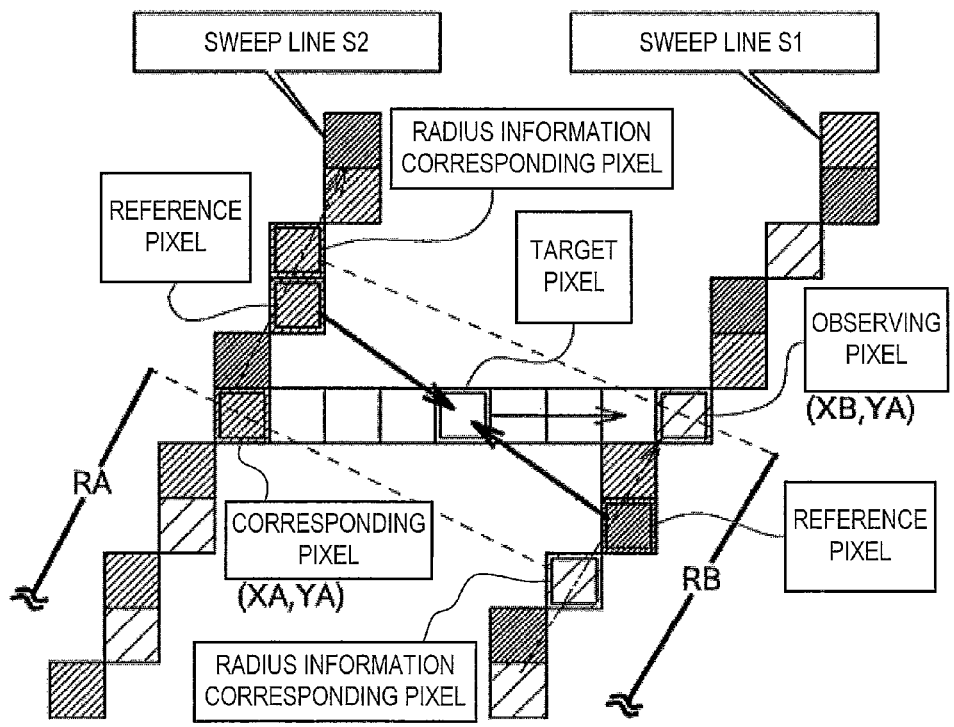

Next, generation processing of interpolation data is described in details. FIG. 3A is a view illustrating the interpolation processing in the X-axis direction, and FIG. 3B is an enlarged view of a portion enclosed by an ellipse of the dashed line in FIG. 3A.

The pixel omission detecting module 31 interpolates the intermediate pixels detected between the sweep line S2 and the sweep line S1 at every line in the X-axis direction (interpolation target line).

When the position of the interpolation target line (interpolation axis) is set by the interpolating content generating module 33, the interpolation processing is performed for every pixel of the intermediate pixels detected by the pixel omission detecting module 31. The interpolation processing can be performed by referring to values either in the XY rectangular coordinate system or on the sweep lines in the polar coordinate system. The interpolation processing using the latter as shown in FIG. 3 is more preferable, because the values on the sweep lines in the polar coordinate system are generally more accurate. Hereinafter, the interpolation processing which is performed for every pixel is described referring to FIG. 3B. In an example shown in FIG. 3B, the coordinates of the corresponding pixel obtained by the pixel omission detecting module are (XA, YA), and the coordinates of the observing pixel are (XB, YA).

The pixel for which interpolation data is generated (hereafter, referred to as a "target pixel") moves for every pixel toward the observing pixel from the corresponding pixel. In an example of FIG. 3B, every time the interpolation data is generated, the value of the X-coordinate of the target pixel is incremented to move the target pixel to the next pixel on the right-hand side. The generated interpolation data is outputted to the display image memory 15, and is written to a suitable position based on the interpolation address. This processing is repeated from the pixel next to the corresponding pixel on the right-hand side to the pixel next to the observing pixel on the left-hand side. When the interpolation data of all the intermediate pixels in the interpolation target line is generated, the interpolation target line is moved to the next line. In the example of FIG. 3B, the value of the Y-coordinate indicating the position of the interpolation target line is decremented to move the interpolation target line to one line below.

In this embodiment, the interpolation data of the target pixel is set based on the content of a reference pixel on the sweep line S2 (previous reference data) and the content of a reference pixel on the sweep line S1 (current reference data). The reference pixel on the sweep line S2 (second equal distance pixel) and the reference pixel on the sweep line S1 (first equal distance pixel) are set in consideration of the position of the target pixel with respect to a starting position (starting point of the sweep line), and they are pixels which correspond to the target pixel in the circumferential direction. The term "pixel which corresponds in the circumferential direction" as used herein refers to a pixel that is set based on the position of an intersection (reference point) between the sweep line and an imagination circle which passes through the target pixel centering on the starting point of the sweep line.

Next, updating of the position of the reference pixel is described. As shown in FIG. 3B, by setting the interpolation target line, a distance RA from the starting position (Xs, Ys)

to the corresponding pixel (XA, YA) and a distance RB from the starting position (Xs, Ys) to the observing pixel (XB, YA) are determined. When the interpolation target line is set, the interpolating content generating module 33 sets a radius information corresponding pixel on the sweep line S1 based on the distance RA. The radius information corresponding pixel on the sweep line S1 is a pixel corresponding to the corresponding pixel on the sweep line S2 in the circumferential direction, and is located on the starting point side of the sweep line rather than the observing pixel. The interpolating content generating module 33 sets the radius information corresponding pixel on the sweep line S2 based on the distance RB. The radius information corresponding pixel on the sweep line S2 is a pixel corresponding to the observing pixel on the sweep line S1 in the circumferential direction, and is located on the terminal point side of the sweep line rather than the corresponding pixel.

The reference point on the sweep line S2 moves toward the radius information corresponding pixel from the corresponding pixel (in the direction separating from the starting point of the sweep line) as the target pixel approaches the observing pixel. On the other hand, the reference point on the sweep line S1 moves toward the observing pixel from the radius information corresponding pixel (in the direction separating from the starting point of the sweep line) as the target pixel approaches the observing pixel. As described above, the reference point on each sweep line moves on the sweep line in one direction, synchronizing with the movement of target pixel.

Because the interpolation processing is performed while moving the target pixel to the right pixel by pixel, the amount of movement of the reference point which moves so as to associate with the movement of the target pixel also becomes constant. This amount of movement can be calculated based on a distance which subtracts RA from RB and a distance from the observing pixel to the corresponding pixel. If the amount of movement of the reference point which moves on the sweep line when the target pixel moves by 1 pixel is set to M, this can be expressed as the following equation.

$$M = \frac{RB - RA}{dx} \quad (2)$$

Here, in the example of FIG. 3B, dx=XB−XA.

Every time the target pixel moves by 1 pixel, the reference point is moved by the amount of movement M calculated by Equation (2). In the example of FIG. 3B, the reference points are moved by the amount of movement M on each sweep line in the direction separating from the starting point of the sweep line. As described above, the position of the reference point corresponding to the position of the target pixel can be obtained accurately by the easy processing in which the amount of movement is added. The reference pixel is reset every time the target pixel moves based on the updated reference point.

Figure 4:
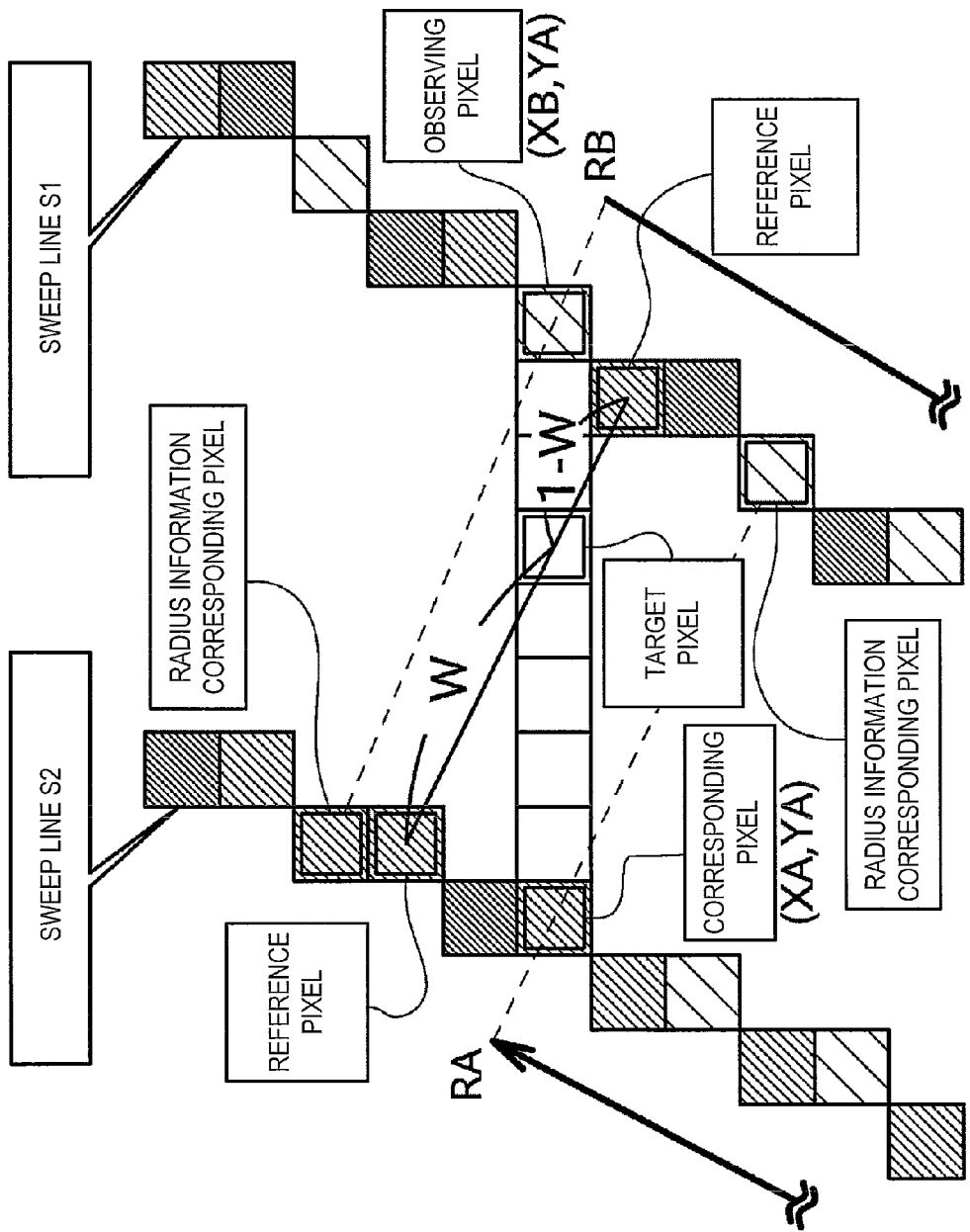
FIG. 4 is a view illustrating weighting processing in the generation of the interpolation data.

As described above, the interpolation data is generated by synthesizing the data indicating the content of the reference pixel on the sweep line S2 and the data indicating the content of the reference pixel on the sweep line S1. Processing for determining the content of the pixel of the interpolation data is described. FIG. 4 is a view illustrating weighting processing in the generation of the interpolation data.

The interpolation data of this embodiment is generated by performing the weighting processing to the data of the reference pixel on each sweep line. This weighting processing is performed so that the content of the reference pixel near the target pixel is emphasized. For example, as shown in FIG. 4, if the distance from the reference pixel on the sweep line S1 to the target pixel is shorter than the distance from the reference pixel on the sweep line S2 to the target pixel, the weighting is carried out so that the content of the reference pixel on the sweep line S1 is emphasized.

More specifically, as shown in FIG. 4, it is assumed that a ratio of the distance from the reference pixel on the sweep line S2 to the target pixel (second distance) and the distance from the reference pixel on the sweep line S1 to the target pixel (first distance) is W:1−W. Here, pixel data of the reference pixel on the sweep line S2 is eA, and pixel data of the reference pixel on the sweep line S1 is eB. In the example of FIG. 4, pixel data ei of the target pixel can be expressed by the following equation.

$$ei = eA \times (1-W) + eB \times W \quad (3)$$

In this equation, W is a weighting coefficient for generating the pixel data of the target pixel.

As described above, each reference pixel also moves so as to associate with the movement of the target pixel. Therefore, it is necessary to calculate also the ratio of W:1−W for every movement of the target pixel. Here, since the target pixel moves pixel by pixel, W increases or decreases by a fixed value. If the value that changes every time the target pixel moves by 1 pixel is represented as an increasing/decreasing value Wr, Wr can be expressed as follows.

$$Wr = \frac{1}{dx} \quad (4)$$

By adding the increasing/decreasing value Wr to W every time the target pixel moves by 1 pixel, the weighting coefficient W corresponding to the target pixel which moved to a new position can be obtained. Note that an initial value of W is 0.

Then, by substituting eA, eB, and W into Equation (3), the pixel data ei of the target pixel can be calculated. The pixel data ei generated in this way is transmitted from the interpolating content generating module 33 to the display image memory 15, and is stored therein. By repeating the above processing every movement of the target pixel, the interpolation data to which the data of the reference pixel is reflected is drawn in all the pixel omitted portions.

Figure 5:
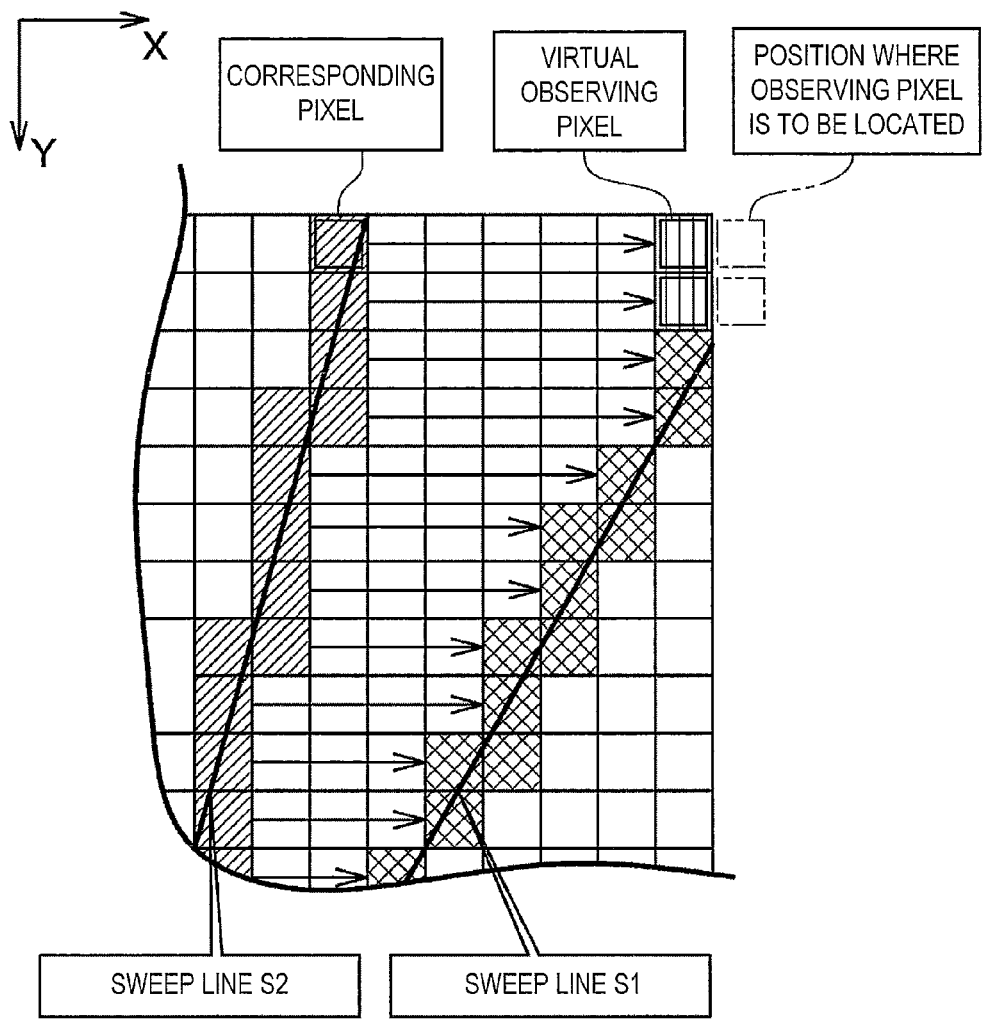
FIG. 5 is a view illustrating interpolation processing performed after setting a virtual observing pixel.

Next, a case where the corresponding pixel or the observing pixel is set virtually is described. Because there is a limit in the display range of the display module 19, in an area which is distant from the starting position (Xs, Ys) such as near the terminal point of the sweep line, the corresponding pixel may not be able to be calculated on the sweep line S2 and the observing pixel may not be able to be calculated on the sweep line S1. In this case, in this embodiment, in order to perform the generation processing of the interpolation data and the interpolation processing as described above, the corresponding pixel or the observing pixel is set virtually. Here, the case where the observing pixel is virtually set is described by means of FIG. 5 as an example. FIG. 5 is a view illustrating the interpolation processing performed by setting a virtual observing pixel.

As shown in FIG. 5, near the terminal point of the sweep line, the corresponding pixel can be obtained as a pixel within the display range of the display module 19. However, the position where the observing pixel is to be located is located outside the display range, and the observing pixel may not be able to be calculated. If the observing pixel cannot be determined, the setting of the intermediate pixels and the generation of interpolation data cannot be performed. Therefore, in this embodiment, the virtual observing pixel is set as an imaginary observing pixel, and the detection of the pixel omission and the generation of the interpolation data are performed based on the virtual observing pixel.

In this embodiment, the position of the virtual observing pixel is, when the position where the observing pixel is to be fundamentally located is located outside the display range of the display module 19, a pixel at the end in the display range of the display module 19 (or an area of the display image memory 15), and obtained as a position of the pixel which is the nearest to the position where the observing pixel is to be located. Note that the virtual observing pixel is always located between the position where the observing pixel is to be fundamentally located and the corresponding pixel. Similarly, also when the position where the reference pixel is to be located is located outside the display range, the reference pixel is virtually set by a suitable method, such as using pixel data of the most distant pixel on each sweep line.

Although it is not necessary in the case of FIG. 5, it may be necessary to set a virtual corresponding pixel as the corresponding pixel, depending on the angle of the sweep line. In this case, the virtual corresponding pixel is set similar to the virtual observing pixel as described above. The setting method of the virtual corresponding pixel and the virtual observing pixel may be changed suitably, such as setting based on the pixel located at the most distant position on the sweep line (equal to the radius of the sweep line displayed on the screen image).

In order to have a good appearance of the image after the interpolation, the interpolation processing is required to be carried out throughout the elongated area between the sweep line S2 and the sweep line S1. Therefore, as described above, in order to perform the interpolation processing in the area distant from the starting position (Xs, Ys) (i.e., the portion located in the edge of the display range of the display module 19), the virtual corresponding pixel or virtual observing pixel may have to be set. If the corresponding pixel and the observing pixel are defined so as to always correspond to each other in the X-axis direction regardless of the direction of the sweep line, the case where the virtual observing pixel or the virtual corresponding pixel must be set will increase in ranges of the sweep angle being near in parallel to the X-axis direction (a range from 45° to 135° and a range from 225° to 315°). Because the virtual corresponding pixel and the virtual observing pixel are unavoidably set at a different pixel from the pixel at the position where it is to be fundamentally located in order to prevent a lack of the interpolation data, the number of the virtual pixels is preferred to be less as possible also in the view of the quality of the interpolation data.

Figure 6A:
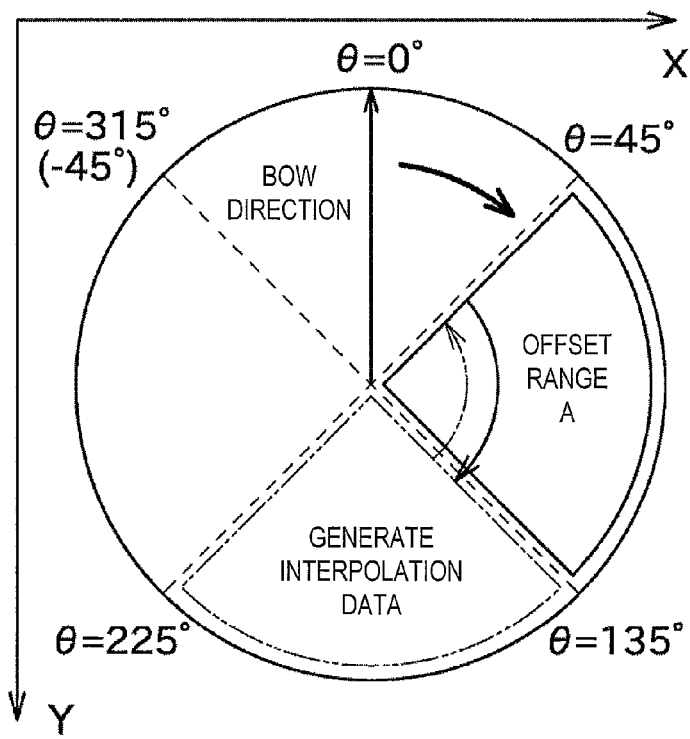
FIGS. 6A and 6B are views illustrating generation and drawing of the interpolation data in an offset range.
Figure 6B:
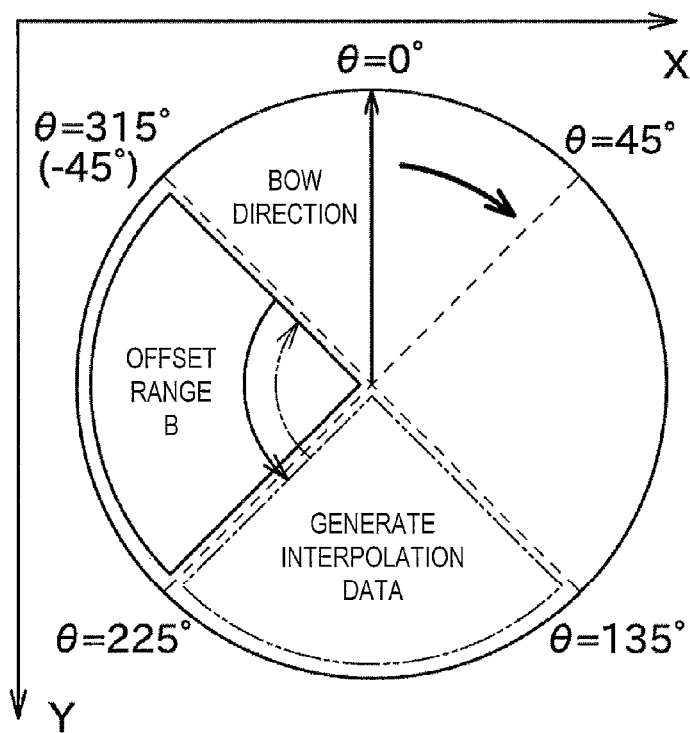

In this embodiment, taking the above situations in consideration, offset processing in which an azimuth direction is temporarily offset is performed in a range where the number of the virtual corresponding pixels or the virtual observing pixels increases. Next, the offset processing is described. FIG. 6A is a view illustrating the interpolation processing when the sweep angle is in the range from 45° to 135°. FIG. 6B is a view illustrating the interpolation processing when the sweep angle is in the range from 225° to 315°.

As shown in FIGS. 6A and 6B, in this embodiment, the range from 45° to 135° is set as an offset range A, and the range from 225° to 315° is set as an offset range B.

When the sweep angle θ is updated, the interpolating content generating module 33 determines whether the sweep angle θ is in the offset range A or the offset range B, and if it is in the offset range, the sweep angle θ is once offset. The determination of whether the sweep angle is in the offset range A or the offset range B is performed by the sweep angle determining module (not illustrated). As the sweep angle referred by the determination, one or both of the angle $θ_n$ of the sweep line S1 and the angle $θ_{n-1}$ of the sweep line S2 can be used.

The generation processing of the interpolation data in the offset range A is described. As shown in FIG. 6A, in the offset range A, after +90° offset (correction) is once added to the sweep angle, the interpolation data is temporarily generated to an area which is shifted by 90°, and the interpolation data is written back to the original area (offset range A). A method of generating the interpolation data temporarily based on the sweep line after the angle offset, is substantially the same as the above method and, thus, the corresponding pixel and the observing pixel are determined so as to correspond to each other in the X-axis direction.

By the above angle offset, the interpolation data generated in the offset range A brings the same result as the case where the interpolation data is generated in the range from 135° to 225° in which the case where the observing pixel or the corresponding pixel must be set virtually is less. The interpolation data generated temporarily is written in the display image memory 15, after a conversion of the interpolation address (90° image rotation processing) is carried out so that the address specifies the intended position of the data.

As shown in FIG. 6B, in the offset range B, after −90° offset is added, generation processing of the interpolation data is performed temporarily, and the interpolation data is written back to the original area (offset range B). This processing is similar to the processing performed in the offset range A, except that the offset angle is different. Here, in the offset range B, the offset is carried out by −90° because the offset angle may exceed 360° if the offset is carried out by +90°. By offsetting at −90°, it is possible to generate the interpolation data without taking the case where the sweep angle exceeds 360° into consideration. As described above, the interpolating content generating module 33 determines whether the interpolation target line is oriented in a direction parallel to the X-axis direction or a direction parallel to the Y-axis direction, according to the angle. In this embodiment, the interpolating content generating module 33 functions as an interpolation axis setting module.

With the above processing, the interpolation data having continuity in the circumferential direction can be generated over all azimuth directions, while effectively reducing the number of the virtual observing pixels and the virtual corresponding pixels.

Figures 7A, 7B:
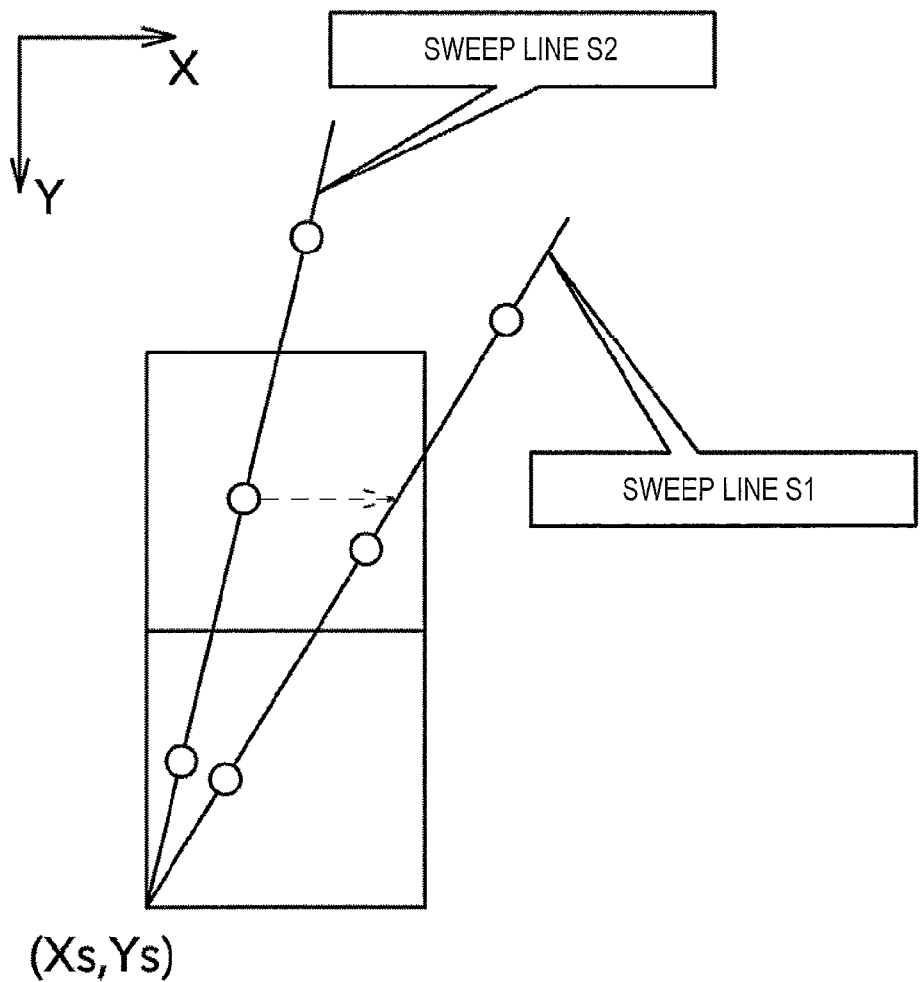
FIGS. 7A and 7B are views illustrating overlap processing near the starting position.

Next, overlap processing that is performed in a range near the ship position (reference position) is described. FIG. 7A is a schematic diagram showing a state where two sweep lines pass through one pixel. FIG. 7B is a schematic diagram showing the content of structure variables prepared for every sample data of the sweep line.

As shown in FIG. 7A, near the ship position (Xs, Ys), two or more straight lines pass through one pixel and, thus, two or more data (sample data) in a polar coordinate system are inputted so that they are shown with white circles overlap on one pixel. In such a pixel, it is preferred to average the plurality of pixel data based on each sample data. For this reason, in this embodiment, a representative value is determined based on the two or more data inputted into the pixel, and this representative value is stored as the pixel data. In this embodiment, the representative value may be a value obtained by dividing the sum total of the maximum value and the minimum value of the two or more data overlapped on one pixel by 2.

Thus, in this embodiment, the determination of the representative value is performed using the structure variables as shown in FIG. 7B. These structure variables include Max, Min, and a flag. Max is a maximum value of the sample data in the same pixel, and Min is a minimum value of the sample data in the same pixel. The flag indicates whether the overlap processing is to be performed. The same number of the structure variables is prepared as the number of the sample data on the sweep line, and the variables are accessed for every sample data by using the value of the Y-coordinate as an index. That is, the structure variables manage the overlapping state of the pixel in each Y-coordinate.

The determination (overlap determination) of the flag is described. As described above, the pixel omission is generated when there is a pixel exists between the corresponding pixel and the observing pixel, and when the corresponding pixel is located adjacent to the observing pixel, the pixel omission is not be generated (see FIG. 2). The corresponding pixel is a pixel drawn based on the sample data of the sweep line S2, and the observing pixel is a pixel drawn based on the sample data of the sweep line S1. In this regard, if the value of the X-coordinate of the corresponding pixel and the value of the X-coordinate of the observing pixel match with each other, two pixel data of the pixel data based on the sweep line S1 and the pixel data based on the sweep line S2 exist in the same pixel. That is, the overlap processing is performed when the value of the X-coordinate of the corresponding pixel and the value of the X-coordinate of the observing pixel are identical.

Taking the above in consideration, in this embodiment, when the value of the X-coordinate of the corresponding pixel and the value of the X-coordinate of to observing pixel match with each other, the flag is set. This overlap determination is performed every time the sample data of the sweep line is inputted, and the maximum value, the minimum value, or the flag value is updated suitably.

Here, a case where the above overlap determination is performed over all azimuth directions of the radar antenna 1 is considered. In this embodiment, the overlap determination is based on whether the values of X-coordinate of the corresponding pixel and the observing pixel match with each other. Therefore, the distance between the sweep lines in the X-axis direction may affect to the overlap determination. For example, in the range from 45° to 135° and the range from 225° to 315°, although the pixel of the sweep line S1 and the pixel of the sweep line S2 overlap with each other in fact, since the values of X-coordinate of the corresponding pixel and the observing pixel do not match with each other, it may not be determined that they are overlapped. This because the distance between both the pixels becomes longer in the angle ranges, as compared with the case where it is determined that the corresponding pixel and the observing pixel correspond to each other in the X-axis direction, and the case where it is determined that they correspond to each other in the Y-axis direction, between the adjacent sweep lines.

For this reason, in this embodiment, the overlap processing is performed simultaneously with the generation processing of the interpolation data after the offset processing is performed, in the offset range A and the offset range B described above. That is, in the offset range A and the offset range B, the overlap determination is performed in a state where the azimuth direction is offset. Thereby, the overlap determination of the offset range can be performed with a sufficient accuracy without performing any special processing.

Figure 8:
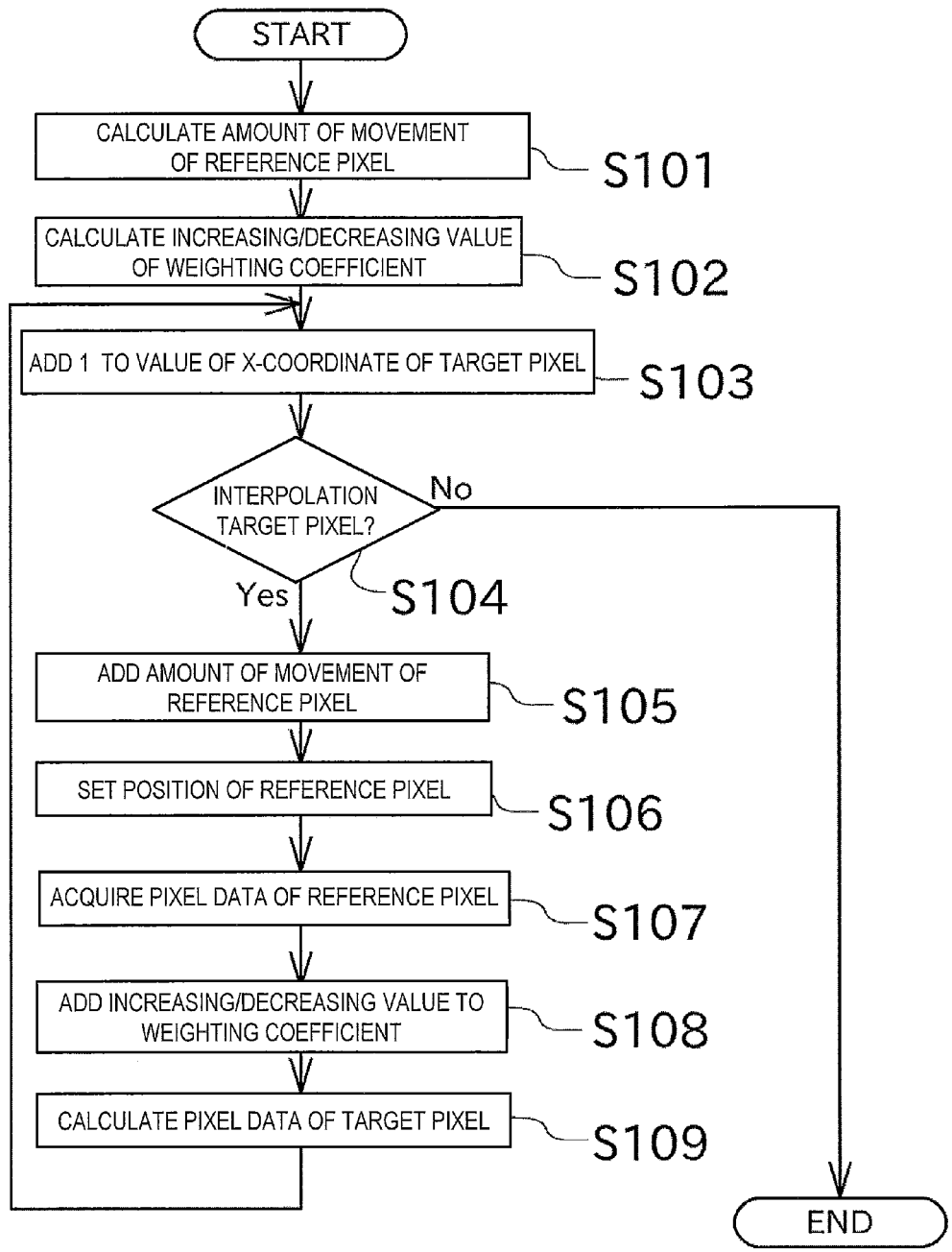
FIG. 8 is a flowchart illustrating the generation processing of the interpolation data.

Next, a flow of the generation processing and the offset processing of the interpolation data is described. FIG. 8 is a flowchart illustrating the generation processing of the interpolation data. Note that the offset determination is performed before this flow of FIG. 8 is started. If it is determined by the offset determination that the offset is necessary, the flow of FIG. 8 is started in a state where the azimuth direction is offset.

When the generation processing of the interpolation data is started, the amount of movement M of the reference pixel when the target pixel moves by 1 pixel is calculated (S101). Along with this, the increasing/decreasing value Wr of W is calculated (S101, S102).

Next, the value of the X-coordinate indicating the position of the target pixel is incremented (S103). Note that, immediately after the interpolation target line moves to a new line, the value of the X-coordinate of the corresponding pixel is set as the initial value, and the processing which adds 1 to this value is performed by processing of S103.

Next, it is examined whether the value of the X-coordinate which is incremented by the processing of S103 is the interpolation target pixel (S104). The term "interpolation target pixel" as used herein refers to the intermediate pixel on the interpolation target line. By the processing of S104, if the value of the X-coordinate matches with the value of the X-coordinate of the observing pixel, it is determined that the interpolation data of all the intermediate pixels on the interpolation target line is generated, and this flow then ends. If the value of the X-coordinate does not match with the value of the X-coordinate of the observing pixel, it is determined that a pixel to be interpolated still exists on the interpolation target line, and the flow proceeds to processing of S105.

In the processing of S105, the interpolating content generating module 33 adds the amount of movement calculated by the processing of S101, and obtains the position of the reference point on each sweep line. Next, the interpolation address generating module 32 sets the reference pixel for every sweep line based on the position of the reference point (S106). The interpolating content generating module 33 acquires the pixel data of the reference pixel on the sweep line S1 and the sweep line S2, respectively (S107).

Next, the interpolating content generating module 33 adds the increasing/decreasing value Wr calculated by the processing of S102 to the weighting coefficient W (S108). Then, the pixel data of the reference pixel on the sweep line S1, the pixel data of the reference pixel on the sweep line S2, and the weighting coefficient W acquired by the processing of S108 are substituted into Equation (3) to obtain the pixel data ei of the target pixel (S109). After the processing of S109 is completed, the flow returns to the processing of S103. Then, the flow loops the processing from S103 to S111 until it is determined that the target pixel is not the interpolation target pixel by the processing of S104.

As described above, if it is determined that the target pixel is not the interpolation target pixel by the processing of S104, it means that the generation of all the interpolation data of the pixel omitted portions on the interpolation target line is completed. The interpolation data generated by the processing of this flow is outputted to the display image memory 15, and is written at a suitable position based on the interpolation address. If the offset processing is carried out before the flow starts, the interpolation data is written in the display image memory 15 after suitably converting the interpolation address.

By repeating the above flow every time the interpolation target line is updated, all the pixel omitted portions between the sweep line S1 and the sweep line S2 is drawn with the interpolation data (pixel data ei) which takes the circumferential direction in consideration.

As described above, the radar apparatus 10 includes the drawing address generating module 16 and the interpolating content generating module 33, and each component functions as follows. The drawing address generating module 16 obtains the position of the pixel in the XY rectangular coordinate system corresponding to a point on the sweep line including the information based on the echo signal. The interpolating content generating module 33 draws the interpolation data in the target pixel between the observing pixel which is a pixel on the sweep line S1 and the corresponding pixel which is a pixel on the sweep line S2 and corresponds to the target pixel in the X-axis direction. Then, the interpolating content generating module 33 generates the interpolation data based on the pixel content of the reference pixel which is located on the sweep line S2 and corresponds to the target pixel in the circumferential direction, and the pixel content of the reference pixel which is located on the sweep line S1 and corresponds to the target pixel in the circumferential direction. Further, when the target pixel moves pixel by pixel in the X-axis direction, the interpolating content generating module 33 moves the position of the reference pixel so as to correspond to the movement of the target pixel.

Thereby, even if the display module 19 has many pixels, because the interpolation data is drawn in the X-axis direction, the interpolation processing can be performed throughout the pixel omitted portion between the sweep lines. In addition, because the interpolation data of the target pixel is generated based on the pixel content of the reference pixel which moves to a suitable position associated with the movement of the target pixel, an image which is smooth in the circumferential direction and does not give the user uncomfortableness can be displayed on the display module.

In the radar apparatus 10, the target pixel moves in one direction toward the observing pixel from the corresponding pixel.

Thereby, because the position of the reference pixel is also moved one way (irreversibly), the interpolation processing performed in the X-axis direction can be performed continuously and efficiently.

The interpolating content generating module 33 generates the interpolation data so that the influence of the content of a pixel located at a nearer position to the target pixel among the reference pixel on the sweep line S2 and the reference pixel on the sweep line S1 becomes greater.

Thereby, because the content of the pixel at the position near the target pixel is greatly reflected to the interpolation data, the continuity of interpolation data in the circumferential direction can be improved.

In the radar apparatus 10, the azimuth direction range including the azimuth direction when the drawing direction of the interpolation data and the sweep line become parallel with each other is set in advance as the offset range A and the offset range B, respectively. When the azimuth direction of the sweep line is with in the offset range A or the offset range B, the azimuth direction is offset so that the sweep line is located outside the offset range. The interpolating content generating module 33 generates the offset interpolation data in a state where the azimuth direction is offset, and it draws the offset interpolation data in the target pixel in a state where the offset is canceled.

Thereby, based on the interpolation data generated in the range where the interpolation data can be appropriately generated, the pixel omitted portions of the offset range A and the offset range B can be interpolated. For example, in a range where the direction of the sweep line becomes close to the direction in which the interpolation data is drawn, an interval of the observing pixel and the corresponding pixel becomes large, and, especially near the terminal point of the sweep line, one of the observing pixel and the corresponding pixel may be located outside the display range of the image. By setting such a range as the offset range, both the observing pixel and the corresponding pixel can be located within the display range without performing any special processing and, thus, the processing for appropriately generating the interpolation data can be simplified.

When the coordinates of the observing pixel and the corresponding pixel match with each other, the radar apparatus 10 performs the overlap determination for determining the overlapping pixel at the position which is indicated by the observing pixel and the corresponding pixel. When the azimuth direction of the sweep line is within the offset range A or the offset range B, the overlap determination is performed in a state where the azimuth direction is offset.

Thereby, the overlapping pixel can be detected by the easy processing in which the values of X-coordinate of the observing pixel and the corresponding pixel are examined. In addition, because the overlap determination is performed in a state where the azimuth direction is offset in the offset range A or the offset range B, it can prevent the criteria of the overlap determination from being varied greatly depending on the azimuth direction. Specifically, even when the sweep line S2 and the sweep line S1 similarly pass through one pixel, it may be or may not be determined to be the overlapping pixel. For example, in the offset range A and the offset range B where the direction of the sweep line becomes close to the direction in which the interpolation data is drawn, since the interval between the observing pixel and the corresponding pixel becomes greater, the pixel may not be determined to be the overlapping pixel. In this embodiment, since this range is set as the offset range A and the offset range B, the determination criteria of the overlap processing does not vary greatly even if the azimuth direction changes.

As described above, the pixel data generating device 5 provided to the image display device 2 of the radar apparatus 10 includes the drawing address generating module 16 and the interpolating content generating module 33. The drawing address generating module 16 converts the pixel data on the sweep line S1 (first sweep line) and the pixel data on the sweep line S2 (second sweep line) into the pixel data in the XY rectangular coordinate system, respectively. The interpolating content generating module 33 generates the pixel data of the target pixel located between the observing pixel located on the interpolation target line parallel to the X-axis or the Y-axis of the XY rectangular coordinate system and the corresponding pixel located on the same interpolation symmetrical line. The pixel data of the target pixel is generated based on the pixel data on the sweep line S1 and the pixel data on the sweep line S2.

Thereby, the pixel data of the target pixel can be generated reflecting the pixel data on the sweep line S1 and the pixel data on the sweep line S2. Because the interpolation processing is performed in the direction parallel to the X-axis or the Y-axis, pixel data can be generated without skipping any pixel omitted portions.

The pixel data generating device 5 is configured as follows. The interpolating content generating module 33 generates the pixel data of the target pixel based on a plurality of pixel data including the pixel data of the reference pixel on the sweep line S1 and the pixel data of the reference pixel on the sweep line S2. The reference pixel on the sweep line S1 is a pixel different from the observing pixel. The reference pixel on the sweep line S2 is a pixel different from the corresponding pixel.

Thereby, the pixel data of the target pixel can be generated, taking the pixel data of the pixels which are located on the sweep line S1 and the sweep line S2 and which are not located on the interpolation target line in consideration.

The pixel data generating device 5 may be configured as follows. The interpolating content generating module 33 generates the pixel data of the target pixel based on a plurality of pixel data including the pixel data of the reference pixel on the sweep line S1 and the pixel data of the reference pixel on the sweep line S2. The reference pixel on the sweep line S1 is a pixel located on the sweep line S1, at the substantially equal distance to the distance from the reference position (Xs, Ys) to the target pixel. The reference pixel on the sweep line S2 is a pixel located on the sweep line S2, at the substantially equal distance to the distance from the reference position (Xs, Ys) to the target pixel.

Thereby, an image which does not cause any uncomfortableness in the circumferential direction to the user can be displayed.

The pixel data generating device 5 may be configured as follows. The interpolating content generating module 33 generates the pixel data of the target pixel based on the pixel data of the reference pixel on the sweep line S1 and the pixel data of the reference pixel on the sweep line S2, based on the first distance between the target pixel and the reference pixel on the sweep line S1 (1−W), and based on the second distance between the target pixel and the reference pixel on the sweep line S2 (W) (see FIG. 4).

Thereby, because the distance from the reference pixel to the target pixel is reflected to the pixel data of the target pixel, the image can be made smooth.

The pixel data generating device 5 may be configured as follows. The interpolating content generating module 33 generates the pixel data of the target pixel by proportionally dividing the pixel data of the reference pixel on the sweep line S1 and the pixel data of the reference pixel on the sweep line S2 by the second distance and the first distance, respectively (see FIG. 4).

Thereby, because the content of the pixel data of the reference pixel near the target pixel is greatly reflected to the pixel data of the target pixel, the continuity in the circumferential direction can be further improved.

The pixel data generating device 5 may be configured as follows. The interpolating content generating module 33 sequentially calculates the pixel data of the target pixel located on the interpolation target line. In addition, the interpolation target line is moved sequentially in a direction perpendicular to the interpolation target line.

Thereby, the interpolation processing performed in the X-axis direction or the Y-axis direction can be performed continuously and efficiently.

The pixel data generating device 5 may be configured as follows. The pixel data generating device 5 includes the interpolating content generating module 33 that functions as the interpolation axis setting module. The interpolating content generating module 33 determines whether the direction of the interpolation target line is to be set in the direction parallel to the X-axis or the direction parallel to the Y-axis based on one or both azimuth direction of the sweep line S1 and the sweep line S2.

Thereby, based on the azimuth direction of the sweep line S1 or the sweep line S2, the interpolation target line can be set so that the pixel data of the target pixel can be generated appropriately.

The pixel data generating device 5 may be configured as follows. The interpolating content generating module 33 determines the direction of the interpolation target line based on whether the direction of the sweep line S1 or the direction of the sweep line S2 is close to parallel with the X-axis direction, or whether the direction of the sweep line S1 or the direction of the sweep line S2 is close to parallel with the Y-axis direction.

Thereby, it can prevent the situation in which the pixel data of the target pixel cannot be generated appropriately because the direction of the sweep line becomes close to parallel with the X-axis direction or the Y-axis direction.

Although the embodiment of the present invention is described above, the configuration of the embodiment may be modified further as follows.

The pixel data generating device 5 may also be configured as follows. The interpolating content generating module 33 generates the pixel data of the target pixel based on a plurality of pixel data including the pixel data of the observing pixel and the pixel data of the corresponding pixel. Thereby, the pixel data of the target pixel can also be generated by the simple processing based on the observing pixel and the corresponding pixel on the interpolation target line.

The pixel data generating device 5 may also be configured as follows. The interpolating content generating module 33 generates the pixel data of the target pixel based on a plurality of pixel data including at least any of the pixel data of the observing pixel, the pixel data of the corresponding pixel, the pixel data of the reference pixel on the sweep line S1, and the pixel data of the reference pixel on the sweep line S2. Thereby, the pixel data of the tar get pixel can be flexibly generated according to the portion where the pixel omission is generated.

In the above embodiment, the interpolation data in the offset range is generated by offsetting. However, it may also be configured so that the direction for generating the interpolation data is automatically switched between the X-axis direction and the Y-axis direction according to a predetermined angle range. That is, the radar apparatus 10 automatically switches the direction for generating the interpolation data according to the angle of the sweep line S1 or the angle of the sweep line S2. Thereby, both the observing pixel and the corresponding pixel can be located within the display range, and the processing for appropriately generating the interpolation data can be simplified.

Alternatively, for the pixel omission detection, the offset range A and the offset range B may also be set to detect the pixel omission.

In the above embodiment, the interpolation data of the target pixel is generated based on the pixel data of the reference pixel. However, it is not limited to this. For example, the interpolation data corresponding to the position of the target pixel may also be generated based on the sample data indicating the echo information on the sweep line. In this case, it may be preferred to carry out a linear interpolation of the sample data which are adjacent to each other on the sweep line, and calculate the reference data corresponding to the position of the target pixel.

In the above embodiment, the corresponding pixel position storing memory 40 is adopted as the memory module. However, the configuration of the memory module may be modified suitably. For example, two or more counters may store the pixel positions of the corresponding pixels (the second pixels). If the size of the display image is m×n pixels, the counters are prepared for the number which is the greater-side number in pixels among m and n. For example, if the pixel omission detecting direction is oriented in the X-axis direction, the indexes of the Y-coordinate are assigned to the two or more pixel position storing memories, and the X-coordinate corresponding to the Y-coordinate is stored in each pixel position storing memory. There by, by specifying the Y-coordinate and referring to the content of the counter at the time of detecting the pixel omission, the value of the X-coordinate of the pixel of the sweep line corresponding to the Y-coordinate (sweep line S2) can easily be acquired.

Alternatively, by an arithmetic operation, the pixel positions of the corresponding pixel and the observing pixel can also be calculated sequentially. For example, the pixel positions of the corresponding pixel and the observing pixel may be calculated using a trigonometric function, or the pixel positions may be calculated using the concept of the Bresenham's drawing algorithm.

The radar apparatus 10 may be applied, but not limited to the ship instrument described above.

In the above embodiment, the example in which the present invention is applied to the radar apparatus is described. However, the present invention is not limited to the radar apparatus. The present invention may be applied to an image display device for displaying the information based on the echoes of the detection signals which are transmitted at different azimuth directions, on a display module that is constituted so that pixels are arranged in a matrix structure. Such a kind of the image display device may include a scanning sonar device, for example.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A pixel data generating device for generating a plurality of pixel data as pixel data in an XY rectangular coordinate system, the plurality of pixel data including:
   first pixel data generated on a first sweep line, according to a distance from a transmitting source, based on an echo signal of a detection signal that is discharged from the transmitting source toward a first direction; and
   second pixel data generated on a second sweep line, according to a distance from the transmitting source, based on an echo signal of a detection signal that is discharged from the transmitting source toward a second direction different from the first direction;
   the pixel data generating device, comprising:
   a pixel data converting module for converting the first pixel data and the second pixel data into pixel data in the XY rectangular coordinate system, respectively;
   an interpolation pixel data generating module for generating pixel data of an interpolation target pixel that is located between a first pixel as an observing pixel on an interpolation axis parallel to the X-axis or the Y-axis of the XY rectangular coordinate system and a second pixel as a corresponding pixel on the same interpolation axis, based on the pixel data on the first sweep line and the pixel data on the second sweep line.

2. The pixel data generating device of claim 1, wherein the interpolation pixel data generating module generates the pixel data of the interpolation target pixel, based on a plurality of pixel data including the pixel data of the observing pixel and the pixel data of the corresponding pixel.

3. The pixel data generating device of claim 1, wherein the interpolation pixel data generating module generates the pixel data of the interpolation target pixel, based on a plurality of pixel data including:
   pixel data of a first reference pixel different from the observing pixel, that is the first pixel on the first sweep line, and
   pixel data of a second reference pixel different from the corresponding pixel, that is the second pixel on the second sweep line.

4. The pixel data generating device of claim 1, wherein the interpolation pixel data generating module generates the pixel data of the interpolation target pixel, based on a plurality of pixel data including at least any of:
   pixel data of the observing pixel;
   pixel data of the corresponding pixel;
   pixel data of a first reference pixel different from the observing pixel, that is the first pixel on the first sweep line; and
   pixel data of a second reference pixel different from the corresponding pixel, that is the second pixel on the second sweep line.

5. The pixel data generating device of claim 3, wherein the interpolation pixel data generating module generates the pixel data of the interpolation target pixel, based on a plurality of pixel data including:
   pixel data of a first equal distance pixel located at a substantially equal distance to a distance between a reference position corresponding to the transmitting source and the interpolation target pixel on the first sweep line; and pixel data of a second equal distance pixel located at a substantially equal distance to a distance between the reference position and the interpolation target pixel on the second sweep line.

6. The pixel data generating device of claim 4, wherein the interpolation pixel data generating module generates the pixel data of the interpolation target pixel, based on a plurality of pixel data including:
   pixel data of a first equal distance pixel located at a substantially equal distance to a distance between a reference position corresponding to the transmitting source and the interpolation target pixel on the first sweep line; and
   pixel data of a second equal distance pixel located at a substantially equal distance to a distance between the reference position and the interpolation target pixel on the second sweep line.

7. The pixel data generating device of claim 5, wherein the interpolation pixel data generating module generates the pixel data of the interpolation target pixel, based on:
   the pixel data of the first equal distance pixel and the pixel data of the second equal distance pixel; and
   a first distance between the interpolation target pixel and the first equal distance pixel, and a second distance between the interpolation target pixel and the second equal distance pixel.

8. The pixel data generating device of claim 6, wherein the interpolation pixel data generating module generates the pixel data of the interpolation target pixel, based on:
   the pixel data of the first equal distance pixel and the pixel data of the second equal distance pixel; and
   a first distance between the interpolation target pixel and the first equal distance pixel, and a second distance between the interpolation target pixel and the second equal distance pixel.

9. The pixel data generating device of claim 7, wherein the interpolation pixel data generating module generates the pixel data of the interpolation target pixel, by proportionally dividing the pixel data of the first equal distance pixel and the pixel data of the second equal distance pixel based on the second distance and the first distance, respectively.

10. The pixel data generating device of claim 8, wherein the interpolation pixel data generating module generates the pixel data of the interpolation target pixel, by proportionally dividing the pixel data of the first equal distance pixel and the pixel data of the second equal distance pixel based on the second distance and the first distance, respectively.

11. The pixel data generating device of claim 1, wherein the interpolation pixel data generating module sequentially calculates the pixel data of the interpolation target pixel on the interpolation axis, and sequentially moves the interpolation axis in a direction perpendicular to the interpolation axis.

12. The pixel data generating device of claim 1, further comprising an interpolation axis setting module for determining whether the interpolation axis is to be set in a direction parallel to the X-axis or a direction parallel to the Y-axis, based on at least one of azimuth directions of the first sweep line and the second sweep line.

13. The pixel data generating device of claim 12, wherein the interpolation axis setting module determines the direction of the interpolation axis based on whether a direction of the first sweep line or a direction of the second sweep line is close to be in parallel with the Y-axis, or whether the direction of the first sweep line or the direction of the second sweep line is close to be in parallel with the X-axis.

14. An image display device, comprising:
   the pixel data generating device of claim 1; and
   an image display module for displaying an image based on the pixel data generated by the pixel data generating device.

15. An image display device, comprising:
   the pixel data generating device of claim 2; and
   an image display module for displaying an image based on the pixel data generated by the pixel data generating device.

16. An image display device, comprising:
   the pixel data generating device of claim 3; and
   an image display module for displaying an image based on the pixel data generated by the pixel data generating device.

17. A radar apparatus, comprising:
   the image display device of claim 14;
   a detection signal generating module for generating the detection signal; and
   an antenna module for discharging the detection signal and receiving an echo signal from a target object.

18. A radar apparatus, comprising:
   the image display device of claim 15;
   a detection signal generating module for generating the detection signal; and
   an antenna module for discharging the detection signal and receiving an echo signal from a target object.

19. A method of generating pixel data, comprising:
   generating first pixel data on a first sweep line according to a distance from a transmitting source, based on an echo signal of a detection signal discharged from the transmitting source toward a first direction;
   generating second pixel data on a second sweep line according to a distance from the transmitting source, based on an echo signal of a detection signal discharged from the transmitting source toward a second direction different from the first direction;
   converting the first pixel data and the second pixel data into pixel data in an XY rectangular coordinate system, respectively; and
   generating pixel data of an interpolation target pixel that is located between a first pixel as an observing pixel on an interpolation axis parallel to the X-axis or the Y-axis of the XY rectangular coordinate system and a second pixel as a corresponding pixel on the same interpolation axis, based on the pixel data on the first sweep line and the pixel data on the second sweep line.

* * * * *